United States Patent
Yim et al.

(10) Patent No.: US 9,481,255 B2
(45) Date of Patent: Nov. 1, 2016

(54) METHOD FOR CONTROLLING ON-BOARD CHARGER OF ECO-FRIENDLY VEHICLE

(71) Applicant: Hyundai Motor Company, Seoul (KR)

(72) Inventors: Jeong Bin Yim, Anyang (KR); Jae Hwa Jeon, Hwaseong (KR); Dae Woong Han, Anyang (KR); Sang Kyu Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 125 days.

(21) Appl. No.: 14/569,711

(22) Filed: Dec. 14, 2014

(65) Prior Publication Data

US 2016/0023560 A1    Jan. 28, 2016

(30) Foreign Application Priority Data

Jul. 28, 2014    (KR) .................... 10-2014-0095710

(51) Int. Cl.
*H02J 7/00* (2006.01)
*B60L 11/18* (2006.01)

(52) U.S. Cl.
CPC .......... *B60L 11/1809* (2013.01); *Y02B 70/126* (2013.01); *Y02T 10/7005* (2013.01); *Y02T 10/7022* (2013.01); *Y02T 10/92* (2013.01); *Y02T 90/127* (2013.01)

(58) Field of Classification Search
CPC ..................................................... Y02T 90/14
USPC ......................................................... 320/109
See application file for complete search history.

(56) References Cited

U.S. PATENT DOCUMENTS

| | | | | |
|---|---|---|---|---|
| 5,341,280 | A * | 8/1994 | Divan | H01F 38/14 320/109 |
| 6,204,630 | B1 * | 3/2001 | James | H02J 7/022 320/104 |
| 8,836,289 | B2 * | 9/2014 | Flett | H02P 27/08 318/400.26 |
| 8,933,594 | B2 * | 1/2015 | Kurs | H02P 27/08 307/104 |
| 2013/0271077 | A1 | 10/2013 | Kim et al. | |
| 2014/0103861 | A1 * | 4/2014 | Carletti | H02M 1/4225 320/107 |
| 2015/0077046 | A1 * | 3/2015 | Huang | H02J 50/05 320/108 |
| 2016/0141919 | A1 * | 5/2016 | Ohashi | H02J 7/00 320/108 |

FOREIGN PATENT DOCUMENTS

| | | |
|---|---|---|
| JP | 2013-034349 A | 2/2013 |
| JP | 2014-023429 A | 2/2014 |
| KR | 10-2012-0102308 A | 9/2012 |
| KR | 10-2013-0090678 A | 8/2013 |
| WO | 2013/149076 A1 | 10/2013 |

* cited by examiner

*Primary Examiner* — Suresh Memula
(74) *Attorney, Agent, or Firm* — Mintz Levin Cohn Ferris Glovsky and Popeo, P.C.; Peter F. Corless

(57) ABSTRACT

A method for controlling an on-board charger (OBC) of an eco-friendly vehicle can widen the range of an AC input power frequency at which the charging operation of the OBC is possible without increasing the capacity of a power factor correction (PFC) capacitor. According to the method, an increase in output voltage ripple of the PFC capacitor is suppressed by sensing an AC input voltage frequency and then performing variable control of decreasing output power of the OBC based on the sensed frequency, i.e., a variable control of decreasing the output power of the OBC as the AC input voltage frequency decreases, so that the range of the AC input power frequency at which the charging operation of the OBC is possible can be extended without increasing the capacity of a PFC power element.

5 Claims, 5 Drawing Sheets

METHOD FOR CONTROLLING ON-BOARD CHARGER OF ECO-FRIENDLY VEHICLE

CROSS-REFERENCE TO RELATED APPLICATION

This application claims under 35 U.S.C. §119(a) the benefit of Korean Patent Application No. 10-2014-0095710 filed on Jul. 28, 2014, the entire contents of which are incorporated herein by reference.

BACKGROUND (a) Technical Field

The present invention relates to a method for controlling an on-board charger (OBC) of an eco-friendly vehicle, more particularly, to a method for controlling an OBC of an eco-friendly vehicle, in which the range of an AC input power frequency at which the charging operation of the OBC is possible can be widened without increasing the capacity of a power factor correction (PFC) capacitor.

(b) Description of the Related Art

In general, a plug-in hybrid vehicle, an electric vehicle, or the like, which are eco-friendly vehicles, include a high voltage battery, a traveling motor driven using the high voltage battery as a power source, an inverter for converting AC power into DC power in charging/discharging of the high voltage battery, and the like.

Particularly, a separate charger (also known as an on-board charger (OBC)) for generating charging current with respect to the high voltage battery by converting external power (e.g., power of electric vehicle supply equipment (EVSE) or household AC power) into rechargeable AC power is mounted in the eco-friendly vehicle. Accordingly, electric energy necessary for traveling is charged in the battery through the OBC from charging equipment, so that the driving of the eco-friendly vehicle is performed.

A battery charging method using the charger includes applying household AC power to the charger mounted in a vehicle; generating charging current by allowing AC power to be converted into DC power by the charger; and charging a high voltage battery by applying the charging current generated in the charger to the high voltage battery.

FIG. 1 (RELATED ART) is a configuration view illustrating an OBC of an eco-friendly vehicle.

As shown in FIG. 1, the OBC includes an AC power rectifier 10, a power factor correction (PFC) converter 12 for correcting a power factor, a DC-DC converter 14 for performing charging control by converting a voltage charged to a high voltage battery 16 into a DC voltage, and the like.

Particularly, the PFC converter 12 is configured between the AC power rectifier 10 and the DC-DC converter 14 in the OBC, in consideration that the improvement of the power factor is essentially required as the high voltage battery is charged using AC power.

An output capacitor 13 of the PFC converter 12 generates and outputs an output voltage ripple of a sine wave by absorbing input current (in the direction of the arrow in FIG. 1) following the rectification form of AC input power due to PFC control.

More specifically, the output capacitor 13 of the PFC converter 12 generates an output voltage ripple of a PFC capacitor (see FIG. 2 (RELATED ART), graph (a)) representing a sine wave by absorbing an input current ripple of the PFC capacitor (see FIG. 2 (RELATED ART), graph (b)) input to the output capacitor 13.

In this state, as shown in the following Equation 1 representing a correlation between the input current ripple of the PFC capacitor and the output voltage ripple of the PFC capacitor, the capacitor output voltage ripple of the PFC converter 12 is in proportion to the magnitude of an AC ripple flowing through the output capacitor 13, and is in inverse proportion to the capacity of the output capacitor 13 and an AC input power frequency.

$$\Delta V = k \frac{\Delta I}{C \cdot f_{ac}} \qquad \text{Equation 1}$$

In Equation 1, $\Delta V$ represents an output voltage ripple of the PFC capacitor, $\Delta I$ represents an input current ripple of the PFC capacitor, C represents a capacity of the PFC capacitor, and $f_{ac}$ represents an AC input power frequency.

According to Equation 1, the magnitude of the capacitor output voltage ripple $\Delta V$ of the PFC capacitor when the capacity of the PFC capacitor is identical to the input current ripple is changed depending on a frequency as shown in FIG. 3 illustrating the magnitude of an output voltage ripple of the PFC capacitor for each input power frequency.

More specifically, as the AC input power frequency decreases (low frequency), the magnitude of the output voltage ripple $\Delta V$ of the PFC capacitor increases. Particularly, if the AC input power frequency is decreased to a predetermined frequency or less, there occurs a case where the maximum value of the output voltage ripple $\Delta V$ of the PFC capacitor exceeds a PFC output over-voltage protection specification (protection range). Therefore, the operation of the PFC converter is temporarily impossible, and the charging operation of the OBC is also restricted.

In order to solve such a problem, a method was conventionally used which increases the capacity of the PFC capacitor in order to widen the range of an AC input power frequency at which the charging operation of the OBC is possible.

As shown in FIG. 4 (RELATED ART), as the AC input power frequency decreases, the required capacity of the PFC capacitor rapidly increases. Therefore, the capacity of the PFC capacitor should increase about two times greater than that of existing capacitors in order to extend 40 Hz that is an operating region of the existing capacitors up to 20 Hz.

However, as the capacity of the PFC capacitor is increased in order to widen the range of the AC input power frequency, an increase in cost of the OBC is caused, and the packaging performance in manufacturing of the OBC may be deteriorated.

SUMMARY

The present invention provides a method for controlling an on-board charger (OBC) of an eco-friendly vehicle, in which an increase in output voltage ripple of a power factor correction (PFC) capacitor is suppressed by sensing an AC input voltage frequency and then performing variable control of decreasing output power of the OBC based on the sensed frequency, i.e., a variable control of decreasing the output power of the OBC as the AC input voltage frequency decreases, so that the range of the AC input power frequency at which the charging operation of the OBC is possible can be extended without increasing the capacity of a PFC power element.

In one aspect, the present invention provides a method for controlling an OBC of an eco-friendly vehicle, the method including: detecting a current AC input power frequency f input to a power factor correction (PFC) converter of the OBC; comparing magnitudes between the current AC input power frequency f and a first low frequency $f_{min1}$ that is a frequency at a time when the maximum value of an output voltage ripple of a PFC capacitor does not exceed a PFC output over-voltage protection specification; comparing magnitudes between the current AC input power frequency f and a second low frequency $f_{min2}$ that is a limit reference frequency of variable control of decreasing an output power $P_{out}$ of the OBC, when the current AC input power frequency f is less than the first low frequency $f_{min1}$; and performing power derating control of decreasing the output power $P_{out}$ of the OBC, when the current AC input power frequency f is less than the first low frequency $f_{min1}$, and simultaneously greater than the second low frequency $f_{min2}$.

A non-transitory computer readable medium containing program instructions executed by a controller can include: program instructions that detect a current AC input power frequency input to a power factor correction (PFC) converter of an on-board charger (OBC) of an eco-friendly vehicle; program instructions that compare magnitudes between the current AC input power frequency (f) and a first low frequency ($f_{min1}$) that is a frequency at a time when the maximum value of an output voltage ripple of a PFC capacitor does not exceed a PFC output over-voltage protection specification; program instructions that compare magnitudes between the current AC input power frequency (f) and a second low frequency ($f_{min2}$) that is a limit reference frequency of variable control of decreasing an output power ($P_{out}$) of the OBC, when the current AC input power frequency (f) is less than the first low frequency ($f_{min1}$); and program instructions that perform power derating control of decreasing the output power $P_{out}$ of the OBC, when the current AC input power frequency (f) is less than the first low frequency ($f_{min1}$), and simultaneously greater than the second low frequency ($f_{min2}$).

Other aspects and exemplary embodiments of the invention are discussed infra.

As described above, the method according to the present invention has advantages as follows.

First, if an AC input voltage frequency is sensed, and the sensed frequency is less than a predetermined frequency, the variable control of decreasing the output power of the OBC is performed, so that it can be suppressed that the output voltage ripple of the PFC capacitor is raised to the PFC output over-voltage protection specification or more. Accordingly, the range of the AC input power frequency at which the charging operation of the OBC is possible can be extended without increasing the capacity of a PFC power element.

Second, as the range of the AC input power frequency at which the charging operation of the OBC is possible can be extended without increasing the capacity of the PFC power element, it is possible to optimize the capacity of the PFC capacity and to reduce cost as compared with the use of the existing PFC capacitor of which capacity is increased.

Third, as the capacity of the PFC capacitor is decreased, it is possible to extend the degree of freedom of packaging inside the OBC and to improve the output density of the OBC.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
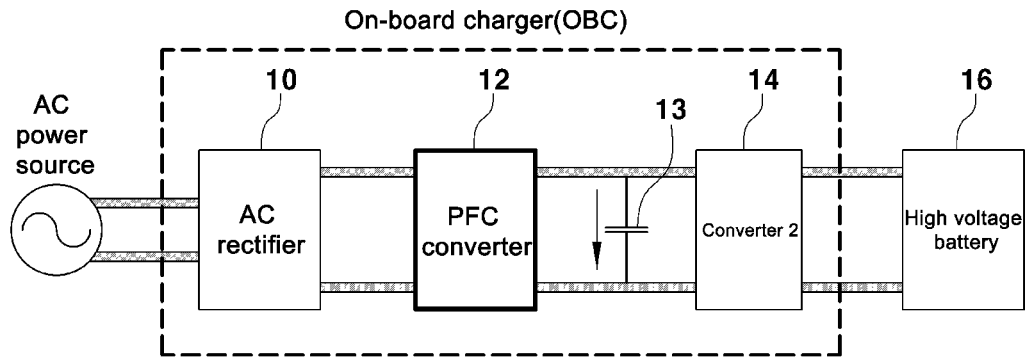
FIG. 1 (RELATED ART) is a schematic view illustrating the configuration of an on-board charger (OBC) of an eco-friendly vehicle.
Figure 2:
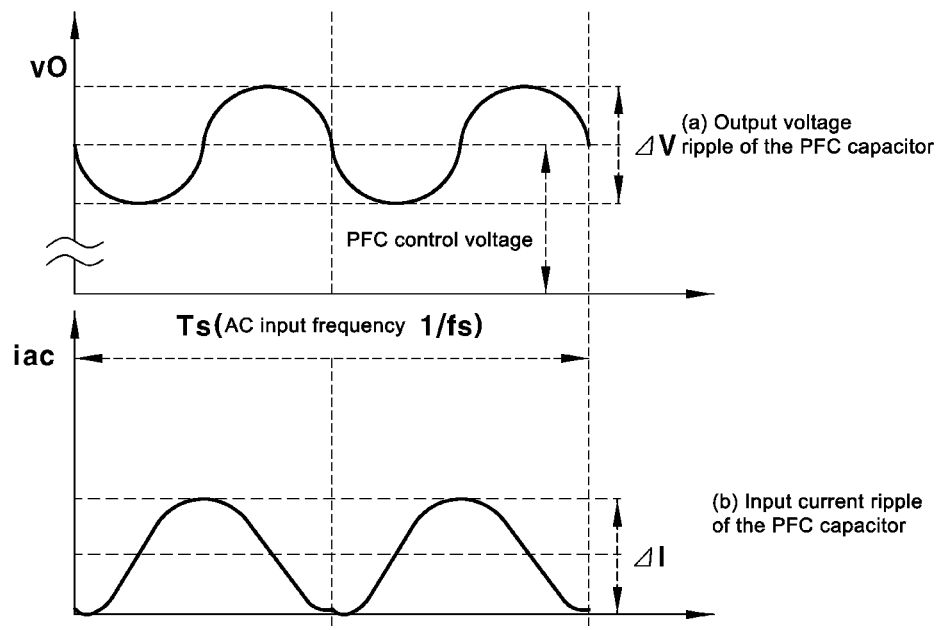
FIG. 2 (RELATED ART) (a) and (b) are graphs illustrating an output voltage ripple of a power factor correction (PFC) capacitor and an input current ripple of the PFC capacitor in the OBC.
Figure 3:
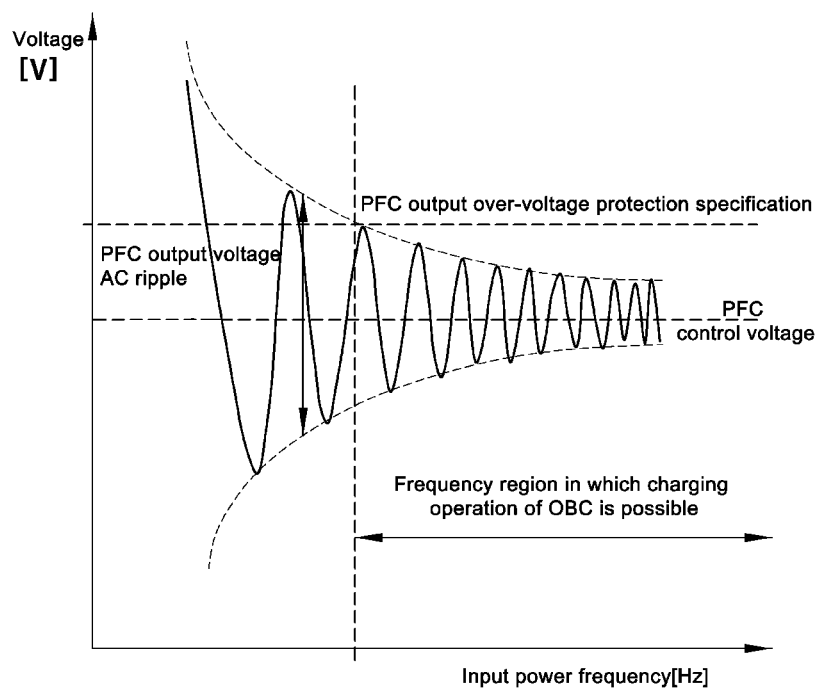
FIG. 3 (RELATED ART) is a graph illustrating a case where the output voltage ripple of the PFC capacitor conventionally exceeded a PFC output over-voltage protection range in a low frequency region.
Figure 4:
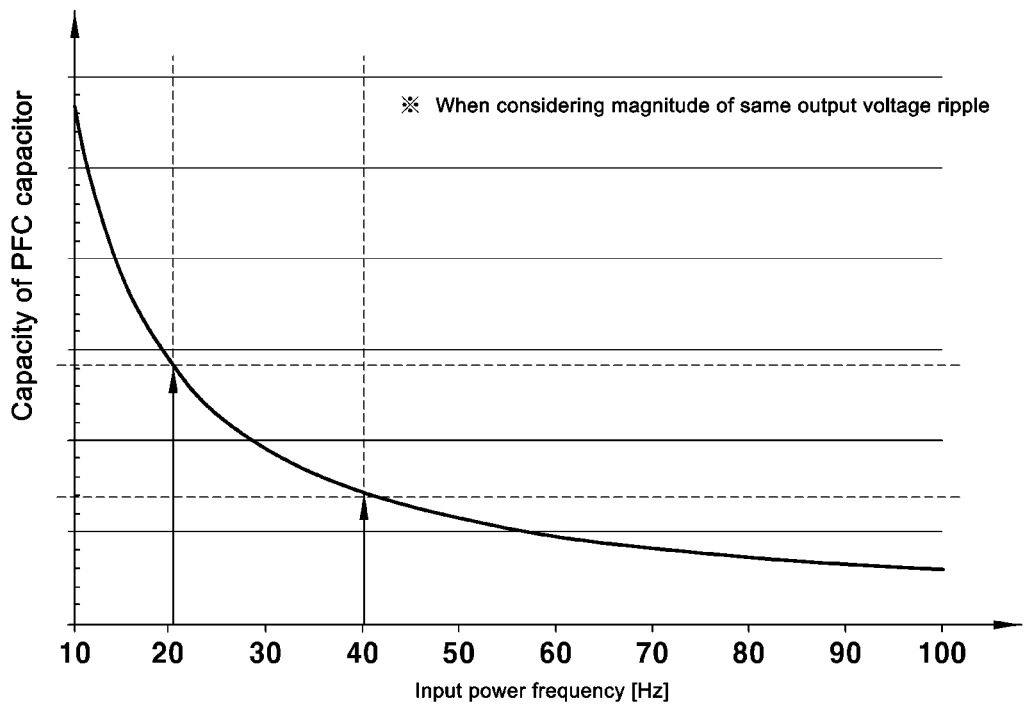
FIG. 4 (RELATED ART) is a graph illustrating a capacity of the PFC capacitor for each AC input power frequency.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

To assist in understanding the present invention, the frequencies at end and start points of a low frequency section of an AC input power frequency that cause a case where an output voltage ripple of a power factor correction (PFC) capacitor exceeds a PFC output over-voltage protection specification will be respectively referred to as a first low frequency $f_{min1}$ and a second low frequency $f_{min2}$.

In addition, it should be understood that the first low frequency $f_{min1}$ is a reference frequency at a time when the output voltage ripple of the PFC capacitor does not exceed the PFC output over-voltage protection specification, and the second low frequency $f_{min2}$ is a limit reference frequency of variable control of decreasing output power $P_{out}$ of an on-board charger (OBC).

Figure 5:
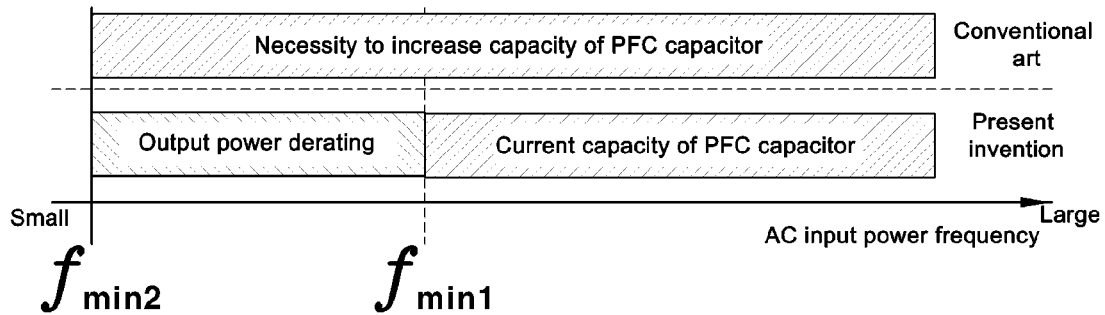
FIG. 5 is a view comparing regions in which the charging operation of the OBC is possible according to the present invention versus the conventional art, as compared with an AC input power frequency at which the charging operation of the OBC is possible.

Referring to FIG. 5, if the AC input power frequency was lowered to a predetermined frequency or less, such as a section between the first low frequency $f_{min1}$ and the second low frequency $f_{min2}$, the capacity of an output capacitor of a PFC converter was conventionally increased. However, according to the present invention, power derating control of decreasing the output power of the OBC in a frequency region between the first low frequency $f_{min1}$ and the second low frequency $f_{min2}$ is performed without increasing the capacity of the output capacitor of the PFC converter.

In particular, if the range of an AC input power frequency at which the charging operation of the OBC is possible is intended to be extended from the first low frequency $f_{min1}$ to the second low frequency $f_{min2}$, in the conventional method, the capacity of the output capacitor of the PFC converter is to be increased at a ratio of $f_{min1}/f_{min2}$ as shown in the following Equation 2. However, according to the present invention, the power derating control of decreasing the output power of the OBC in an AC input power frequency region between the first low frequency $f_{min1}$ and the second low frequency $f_{min2}$ is performed so that the charging operation range of the OBC can be extended up to the second low frequency $f_{min2}$ with only the capacity $C_1$ of the output capacitor at the first low frequency $f_{min1}$.

$$C_2 = k \frac{\Delta I}{\Delta V \cdot f_{min2}}, C_1 = k \frac{\Delta I}{\Delta V \cdot f_{min1}} \therefore C_2 = \frac{f_{min1}}{f_{min2}} \cdot C_1 \quad \text{Equation 2}$$

In Equation 2, $\Delta V$ represents an output voltage ripple of the PFC capacitor, $\Delta I$ represents an input current ripple of the PFC capacitor, $C_1$ represents a capacity of the PFC capacitor at the first low frequency $f_{min1}$, and $C_2$ represents a capacity of the PFC capacitor at the second low frequency $f_{min2}$.

Accordingly, in the present invention, the output power of the OBC is decreased by an incremental ratio of the output voltage ripple of the PFC capacitor in the frequency region between the first low frequency $f_{min1}$ and the second low frequency $f_{min2}$, so that it is possible to prevent the output voltage ripple of the PFC capacitor from exceeding the PFC output over-voltage protection specification. Further, the range of the AC input power frequency at which the charging operation of the OBC is possible can be extended up to the existing low frequency section without increasing the capacity of the output capacitor that is a PFC power element.

Figure 6:
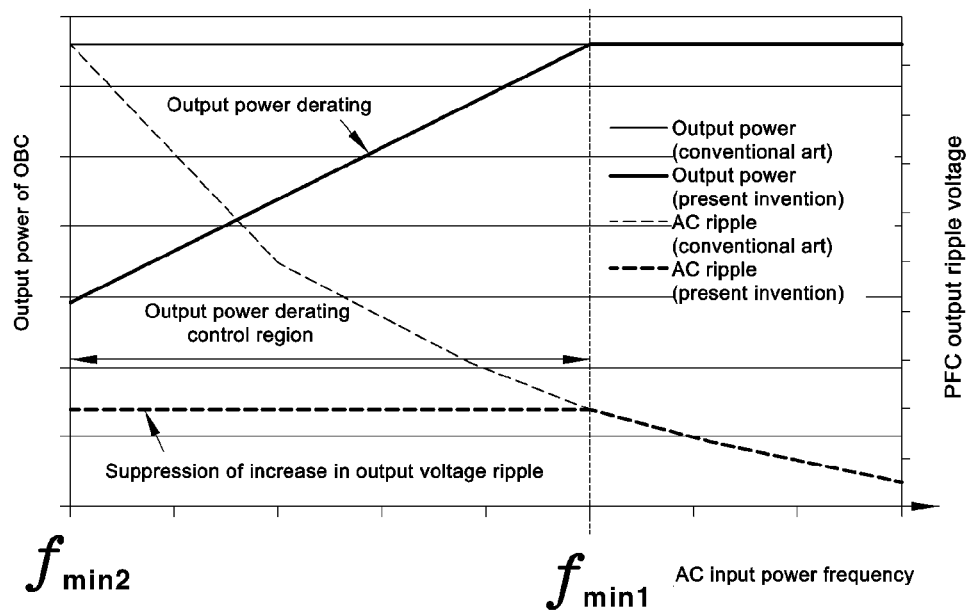
FIG. 6 is a graph illustrating an output power derating control technique of the OBC, as a method for controlling the OBC according to the present invention as compared with the conventional art.
Figure 7:
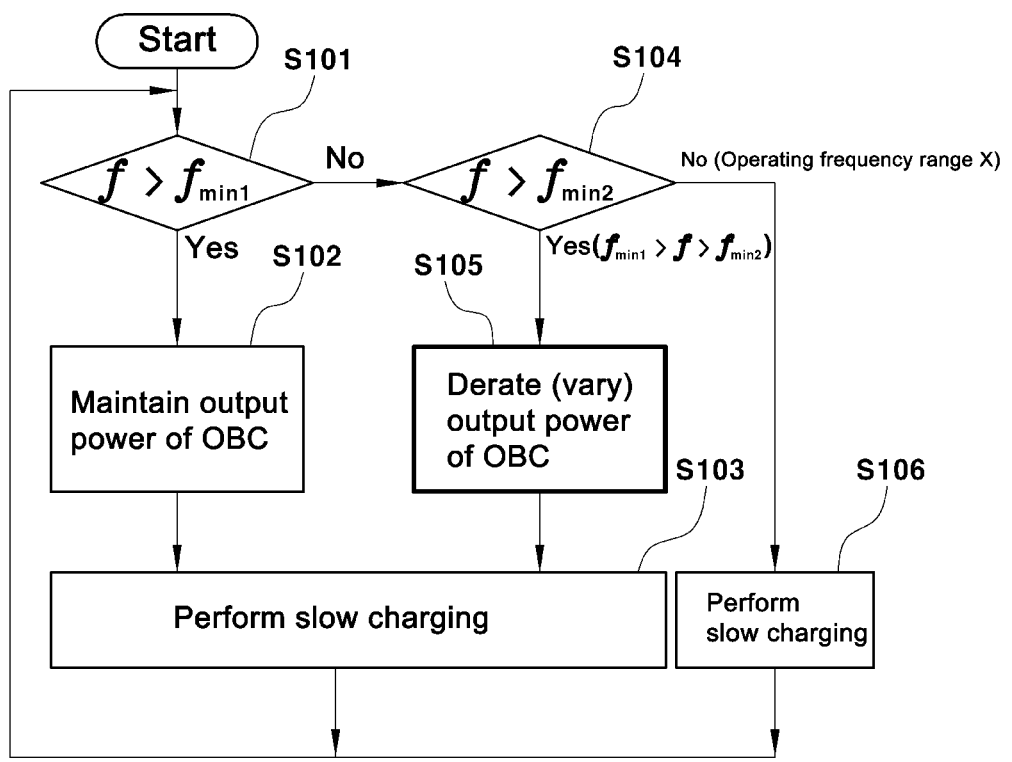
FIG. 7 is a flowchart illustrating the method for controlling the OBC according to the present invention.

Hereinafter, a method for controlling an OBC of an eco-friendly vehicle will be described in detail with reference to FIGS. 6 to 8.

As described above, the output capacitor 13 of the PFC converter 12 generates and outputs an output voltage ripple of a sine wave by absorbing input current following the rectification form of AC input power due to PFC control.

In this state, as shown in the following Equation 3 representing a correlation between the output power $P_{out}$ of the OBC and the output voltage ripple of the PFC capacitor, the output voltage ripple of the PFC capacitor increases in proportion to the output power $P_{out}$.

$$\Delta V = k \frac{\Delta I}{C \cdot f_{ac}}, \Delta I \propto P_{out} \quad \Delta V \propto k \frac{P_{out}}{C \cdot f_{ac}} \quad \text{Equation 3}$$

In Equation 3, $\Delta V$ represents an output voltage ripple of the PFC capacitor, $\Delta I$ represents an input current ripple of the PFC capacitor, C represents a capacity of the PFC capacitor, and $f_{ac}$ represents an AC input power frequency.

Thus, in the present invention, in consideration that the output voltage ripple of the PFC capacitor increases in proportion to the output power $P_{out}$, the increase in the output voltage ripple $\Delta V$ of the PFC capacitor can be suppressed through control of decreasing the output power as the AC power input frequency decreases.

To this end, a step of measuring or estimating a current AC input power frequency input to the PFC converter of the OBC from an AC power source (external power source) is first performed.

Subsequently, the magnitudes between the current AC input power frequency f and the first low frequency $f_{min1}$ are compared (S101).

As described above, the first low frequency $f_{min1}$ is a predetermined reference frequency. As shown in FIGS. 6 and 8, the first low frequency $f_{min1}$ is a frequency at a time when the maximum value of the output voltage ripple ΔV of the PFC capacitor does not exceed the PFC output over-voltage protection specification.

Accordingly, if the current AC input power frequency f is greater than the first low frequency $f_{min1}$, the maximum value of the output voltage ripple ΔV of the PFC capacitor does not exceed the PFC output over-voltage protection specification, and thus control of maintaining an output power for charging of the OBC as it is without increasing or decreasing the output power is performed (S102).

Therefore, when the current AC input power frequency f is greater than the first low frequency $f_{min1}$, the output power for charging of the OBC is maintained, so that the slow charging of a high voltage battery is smoothly performed (S103).

On the other hand, if the current AC input power frequency f is less than the first low frequency $f_{min1}$, the magnitudes between the current AC input power frequency f and the second low frequency $f_{min2}$ are compared (S104).

As described above, the second low frequency $f_{min2}$ is a limit reference frequency of variable control of decreasing the output power $P_{out}$ of the OBC.

Accordingly, if the current AC input power frequency f is less than the first low frequency $f_{min1}$ and simultaneously greater than the second low frequency $f_{min2}$, power derating control of decreasing the output power $P_{out}$ of the OBC is performed (S105).

Preferably, the power derating control of decreasing the output power of the OBC is performed until the output voltage ripple of the PFC capacitor does not exceed the PFC output over-voltage protection specification.

Figure 8:
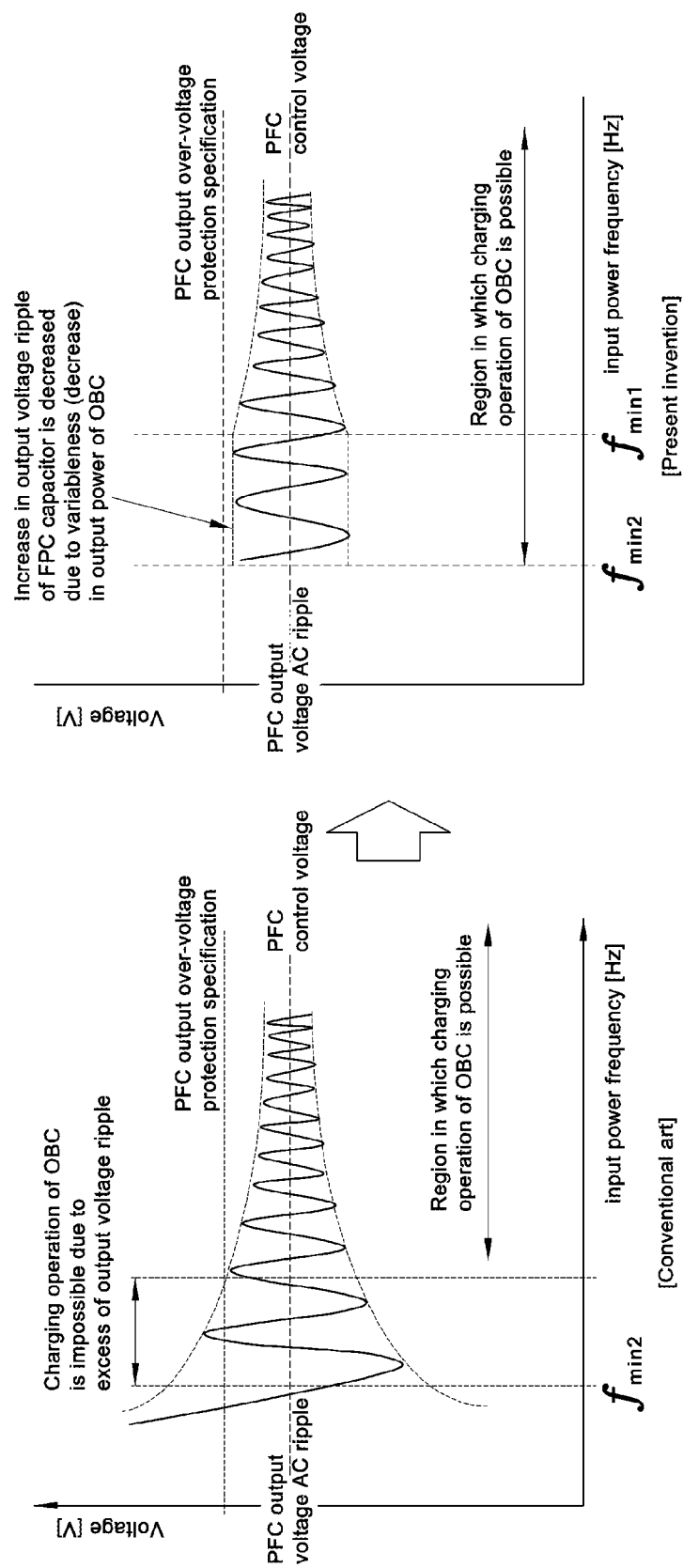
FIG. 8 is a graph illustrating a result of the output power derating control, as the method for controlling the OBC according to the present invention as compared with the conventional art.

Thus, as shown in FIG. 8, if the AC input power frequency was decreased to a predetermined frequency or less, such as a section between the first low frequency $f_{min1}$ and the second low frequency $f_{min2}$, there occurred a case where the maximum value of the output voltage ripple of the PFC capacitor exceeded the PFC output over-voltage protection specification, and therefore, the operation of the PFC converter was impossible. On the other hand, in the present invention, it can be prevented by the power derating control that the output voltage ripple of the PFC capacitor exceeds the PFC output over-voltage protection specification in the section between the first low frequency $f_{min1}$ and the second low frequency $f_{min2}$. As a result, the range of the AC input power frequency at which the charging operation of the OBC is possible can be extended up to the existing low frequency section (e.g., the second low frequency $f_{min2}$) without increasing the capacity of the output capacitor that is a PFC power element.

Meanwhile, when the current AC input power frequency f is changed to less than the second low frequency $f_{min2}$, the maximum value of the output voltage ripple of the PFC capacitor excessively exceeds the PFC output over-voltage protection specification, and therefore, the operation of the power element of the OBC is impossible. Accordingly, the charging operation of the OBC is stopped in order to protect the PFC capacitor that is a power element of the OBC.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling an on-board charger (OBC) of an eco-friendly vehicle, the method comprising the steps of:
    detecting a current AC input power frequency (f) input to a power factor correction (PFC) converter of the OBC;
    comparing magnitudes between the current AC input power frequency (f) and a first low frequency ($f_{min1}$) that is a frequency at a time when the maximum value of an output voltage ripple of a PFC capacitor does not exceed a PFC output over-voltage protection specification;
    comparing magnitudes between the current AC input power frequency (f) and a second low frequency ($f_{min2}$) that is a limit reference frequency of variable control of decreasing an output power ($P_{out}$) of the OBC, when the current AC input power frequency (f) is less than the first low frequency ($f_{min1}$); and
    performing power derating control of decreasing the output power $P_{out}$ of the OBC, when the current AC input power frequency (f) is less than the first low frequency ($f_{min1}$), and simultaneously greater than the second low frequency ($f_{min2}$).

2. The method of claim 1, wherein the power derating control of decreasing the output power of the OBC is performed until the output voltage ripple of the PFC capacitor does not exceed the PFC output over-voltage protection specification.

3. The method of claim 1, wherein, when the current AC input power frequency (f) is greater than the first low frequency ($f_{min1}$), control of maintaining output power for charging of the OBC is performed.

4. The method of claim 1, wherein, when the current AC input power frequency (f) is changed to less than the second low frequency ($f_{min2}$), control of stopping the charging operation of the OBC is performed.

5. A non-transitory computer readable medium containing program instructions executed by a controller, the computer readable medium comprising:
    program instructions that detect a current AC input power frequency input to a power factor correction (PFC) converter of an on-board charger (OBC) of an eco-friendly vehicle;
    program instructions that compare magnitudes between the current AC input power frequency (f) and a first low frequency ($f_{min1}$) that is a frequency at a time when the maximum value of an output voltage ripple of a PFC capacitor does not exceed a PFC output over-voltage protection specification;
    program instructions that compare magnitudes between the current AC input power frequency (f) and a second low frequency ($f_{min2}$) that is a limit reference frequency of variable control of decreasing an output power ($P_{out}$) of the OBC, when the current AC input power frequency (f) is less than the first low frequency ($f_{min1}$); and
    program instructions that perform power derating control of decreasing the output power $P_{out}$ of the OBC, when the current AC input power frequency (f) is less than the first low frequency ($f_{min1}$), and simultaneously greater than the second low frequency ($f_{min2}$).

* * * * *